(12) United States Patent
Konno et al.

(10) Patent No.: US 6,512,344 B1
(45) Date of Patent: Jan. 28, 2003

(54) CONTROL APPARATUS EQUIPPED WITH BACK DRIVE

(75) Inventors: Mitsuo Konno, Kakamigahara (JP); Yoichiro Asada, Kakamigahara (JP); Shuji Nakamura, Kakamigahara (JP)

(73) Assignee: Advanced Technology Institute of Commuter-Helicopter, Ltd., Gifu (JP)

( * ) Notice: Subject to any disclaimer, the term of this patent is extended or adjusted under 35 U.S.C. 154(b) by 0 days.

(21) Appl. No.: 09/450,592

(22) Filed: Nov. 30, 1999

(51) Int. Cl.$^7$ ................................................. B64C 13/08
(52) U.S. Cl. ....................... 318/560; 244/228; 244/234; 74/491
(58) Field of Search ................................ 318/560, 566, 318/652, 653, 671; 244/220, 221, 223, 224, 228, 234; 74/469, 471 R, 473.12, 491, 495

(56) References Cited

U.S. PATENT DOCUMENTS

| | | |
|---|---|---|
| 2,481,776 A | 9/1949 | Osborn |
| 3,099,421 A | 7/1963 | Gerstine |
| 4,150,803 A | 4/1979 | Fernandez |
| 4,345,195 A | 8/1982 | Griffith et al. |
| 4,355,358 A | 10/1982 | Cleford et al. |
| 4,373,184 A | 2/1983 | Lambregts |
| 4,599,698 A | 7/1986 | Fischer et al. |
| 4,607,202 A | 8/1986 | Koenig |
| 4,717,098 A * | 1/1988 | Walker et al. |
| 4,907,970 A * | 3/1990 | Meenen, Jr. |
| 5,125,602 A | 6/1992 | Vauvelle |
| 5,264,768 A | 11/1993 | Gregory et al. |
| 5,291,113 A | 3/1994 | Hegg et al. |
| 5,735,490 A | 4/1998 | Berthet et al. |
| 5,797,564 A | 8/1998 | Cartmell et al. |

FOREIGN PATENT DOCUMENTS

| | | |
|---|---|---|
| GB | 2073114 A | 10/1981 |
| GB | 2135796 A | 9/1984 |
| JP | 59-171794 | 9/1984 |
| JP | 59-209997 | 11/1984 |
| JP | 1-289798 | 11/1989 |
| JP | 8-310494 | 11/1996 |
| JP | 10-230898 | 9/1998 |
| WO | 95/03566 | 2/1995 |

* cited by examiner

Primary Examiner—Bentsu Ro
(74) Attorney, Agent, or Firm—Wenderoth, Lind & Ponack, L.L.P.

(57) ABSTRACT

A control apparatus comprises a control stick, a sensor for detecting the angular displacement amount of the stick and outputting a position signal, a spring for generating an operation force in accordance with the angular displacement amount based on a neutral point of the stick, a back drive unit coupled to the stick via the spring, for driving the stick to move to the neutral point; and a controlling section for controlling the unit, the unit including a differential gear section having input shafts and an output shaft, a back drive motor coupled to the input shaft, an electromagnetic brake coupled to the input shaft, and an output arm coupled to the output shaft to drive the stick, and when the stick is being moved, the electromagnetic brake is put into disconnection to release the input shaft, the motor is rotated in the reverse direction, thereby preventing the occurrence of a transient.

2 Claims, 3 Drawing Sheets

CONTROL APPARATUS EQUIPPED WITH BACK DRIVE

BACKGROUND OF THE INVENTION

1. Field of the Invention

The invention relates to a control apparatus for suitable use in aircraft such as a helicopter, vehicles, robot manipulators, data inputting apparatuses for computers, and the like.

2. Description of the Related Art

In a control apparatus having a back driving function for a control stick, it is possible to select one of modes including a trim mode in which the neutral point of the control stick is shifted by means of the back driving function, and a manual mode in which a back drive unit is disconnected and the control stick is subjected to a manual operation.

In the case where an electromagnetic brake mode is selected when the control stick is being operated, by operating an electromagnetic brake, the electromagnetic brake releases a part of movable components of the back drive unit which have been fixed. Then, the restoring force of a feel unit (spring) which has been displaced by movement of the control stick causes an output arm of the back drive unit and gears sequentially coupling an output shaft with the brake to start to rotate and have an inertial force. Even when the feel unit substantially returns to its natural length and the angle error between the control stick and the output shaft of the back drive unit becomes zero, the members continue to move due to the inertial effect of rotating components. As a consequence, the feel unit is displaced in the reverse direction to produce in the control stick an adverse transient such as an overshoot. When an elastic component such as a reaction force generating spring exists in a part of the back drive transmission system, an overshoot caused by elastic deformation is added to such a transient, and the resulting transient appears as a larger displacement.

As a countermeasure against such a transient, the following techniques are conventionally employed, namely, a) the gear ratio with respect to the brake mechanism is reduced so as to lower the number of rotation, or b) a damper mechanism is disposed in the reaction force generating spring so as to absorb the inertial energy.

In the prior art technique a), when the reduction ratio with respect to the brake mechanism is increased, the brake torque is increased although the number of rotation of the brake is lowered, and hence the size and weight of the brake mechanism are increased. In the prior art technique b), the damper mechanism must be additionally required, thereby increasing the size and weight of the control apparatus as a whole.

SUMMARY OF THE INVENTION

It is an object of the invention to provide a control apparatus in which the occurrence of an adverse transient during the operation of a brake can be surely prevented, and which can be reduced in size and weight and manufactured at a low cost.

The invention provides a control apparatus comprising:

a control section which is supported so as to be angularly displaceable to a housing;

a control amount sensor for detecting an angular displacement amount of the control section and outputting a control amount signal;

an elastic member for generating an operation force in accordance with the angular displacement amount based on a neutral point of the control section;

a back drive mechanism, coupled to the control section via the elastic member, for driving the control section to move the neutral point; and a controlling section for controlling the back drive mechanism, the back drive mechanism including a differential gear mechanism having a first input shaft, a second input shaft and an output shaft; a motor coupled to the first input shaft; a brake mechanism coupled to the second input shaft; and a driving member coupled to the output shaft, for driving the control section, and wherein when the control section is being moved, the brake mechanism is put into disconnection to release the second input shaft, the back drive mechanism rotates the motor in a reverse direction in order to prevent occurrence of a transient.

According to the invention, in the case where when the control section is being moved, the brake mechanism is operated so as to release the second input shaft, the restoring force of the elastic member which has been displaced by movement of the control section causes gears sequentially coupling the output shaft of the back drive mechanism with the brake mechanism to start to operate or rotate, that is, have an inertial force. Since these members continue to operate or rotate due to the inertial effect of the rotating components even when the elastic member substantially returns to its natural length and the angle error between the control section and the output shaft should become zero, the elastic member is displaced in the reverse direction to produce a transient in the control section. When the motor is rotated in the reverse direction in order to prevent the occurrence of a transient, the speed of the inertia-induced operation of the output shaft, which causes a transient, can be lowered and the displacement due to the transient can be canceled by rotation of the motor. As a consequence an influence of the transient is prevented from being transmitted to the control section. At this time, it is preferable to select the rotation amount of the motor to coincide with a temporal change in the displacement of the output shaft which causes the transient. An influence of the transient can be eliminated more surely in this case.

Furthermore, The invention provides a control apparatus comprising:

a control section which is supported so as to be angularly displaceable to a housing;

a control amount sensor for detecting an angular displacement amount of the control section and outputting a control amount signal;

an elastic member for generating an operation force in accordance with the angular displacement amount based on a neutral point of the control section;

a back drive mechanism, coupled to the control section via the elastic member, for driving the control section to move the neutral point; and a controlling section for controlling the back drive mechanism, the back drive mechanism including a differential gear mechanism having a first input shaft, a second input shaft and an output shaft; a motor coupled to the first input shaft; a brake mechanism coupled to the second input shaft; a driving member coupled to the output shaft to drive the control section; and a back drive position sensor for detecting an angular displacement amount of the driving member and outputting a back drive position signal, wherein when the control section is being moved, the brake mechanism is put into disconnection to release the second input shaft, the back drive mechanism temporarily stops the second input shaft by putting the brake mechanism into connection at a time when a relative displacement amount between the control amount signal and the back drive position signal becomes zero, in order to prevent occurrence of a transient.

According to the invention, in the case where when the control section is being moved, the brake mechanism is put into disconnection so as to release the second input shaft, the restoring force of the elastic member which has been displaced causes internal gears, the output shaft, and the driving member of the back drive mechanism to operate so as to follow the movement of the control section. At a time when the relative displacement amount between the control amount signal and the back drive position signal becomes zero, the brake mechanism is temporarily put into connection so as to stop the second input shaft, whereby the brake operates under a condition that the elastic energy accumulated in the elastic member is lost, with the result that the internal gears, output shaft and driving member of the back drive mechanism are stopped. Therefore, an overshoot can be eliminated and an influence of the transient can be further lowered.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
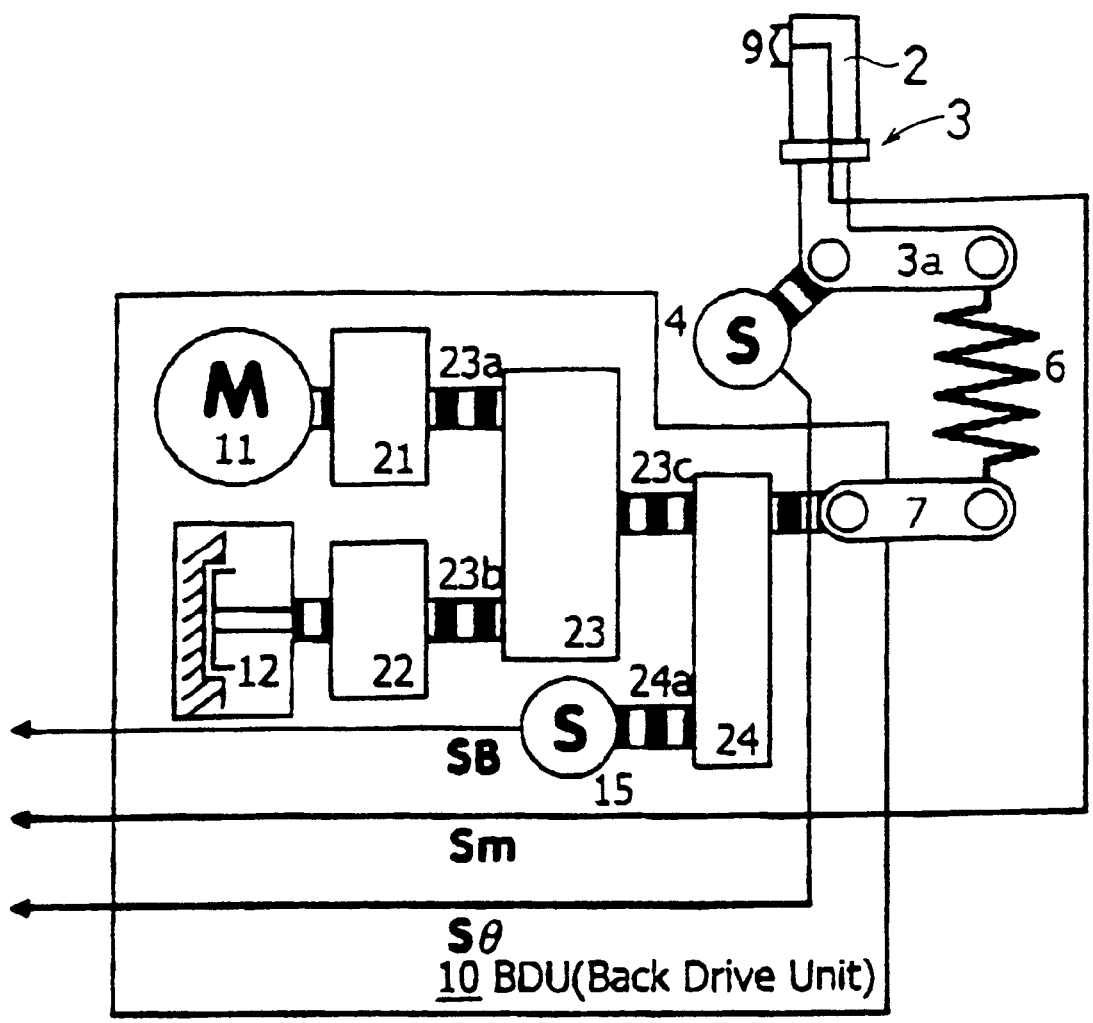
FIG. 1 is a diagram showing the mechanical structure of a control apparatus of the invention.

Now referring to the drawings, preferred embodiments of the invention are described below.

FIG. 1 is a diagram showing the mechanical structure of the control apparatus of the invention. A control stick 3 is supported on a housing (not shown) via a gimbal mechanism or the like so as to be angularly displaced in the anteroposterior or pitch direction and the lateral or roll direction. Although a control system for the pitch axis will be described as an example, the invention can be similarly applied also to controls for the roll axis and other axes, or to foot-operated control pedals.

The upper portion of the stick 3 is formed as a pilot-grasped grip 2. The rotation shaft of the stick 3 is provided with a stick position sensor 4 for detecting an angular displacement amount θ of the stick 3. A stick position signal Sθ outputted from the stick position sensor 4 is supplied to a flight control computer (FCC) as a signal indicative of the control amount.

A switch 9 for canceling a back drive operation is attached to the periphery of the grip 2, and outputs an electromagnetic signal Sm.

An end portion of a swing arm 3a interlocked with the stick 3 is coupled to an output arm 7 of a back drive unit (BDU) 10. A feel producing spring 6 is interposed between the arms 3a and 7. The spring 6 provides the swing arm 3a with an elastic force in accordance with the spring constant assuming that the position of the output arm 7 is an origin, thereby generating a constant feel in the stick 3. A point where the stick 3 is put into a standstill under the condition that the grip 2 is released serves as the neutral point. The neutral point is varied in accordance with the position of the output arm 7. In contrast, when the back drive unit 10 actively controls the position of the output arm 7, it is possible to realize automatic control under a condition that the stick is not held.

The back drive unit 10 comprises a back drive motor 11 for supplying a driving force of the output arm 7, a gear mechanism for coupling the output arm 7 to the back drive motor 11, a back drive unit position sensor 15 for detecting the position of the output arm 7 and outputting a back drive position signal SB, and an electromagnetic brake 12 for controlling the torque transmission of the gear mechanism.

The gear mechanism comprises a gear train 21 having a predetermined gear ratio coupled to the back drive motor 11, a gear train 22 having a predetermined gear ratio coupled to the electromagnetic brake 12, a differential gear section 23 having input shafts 23a and 23b which are respectively coupled to the gear trains 21 and 22, and an output shaft 23c, and an output gear train 24 coupled to the output shaft 23c to rotate the output arm 7.

The differential gear section 23 is configured of a planetary gear mechanism and the like so that the difference between the number of rotation of the input shaft 23a and that of the input shaft 23b coincides with that of the output shaft 23c.

In a normal operation in which the back driving function operates, the electromagnetic brake 12 is in a connection state, and the input shaft 23b of the differential gear section 23 is locked, thereby allowing the torque of the back drive motor 11 to be transmitted as it is to the output shaft 23c. When the back driving function is to be turned off during the operation of the brake, the electromagnetic brake 12 is unlocked to enable the input shaft 23b to freely rotate. As a result, the torque transmission from the back drive motor 11 to the output shaft 23c is interrupted so as to make also the output arm 7 free.

Figure 2:
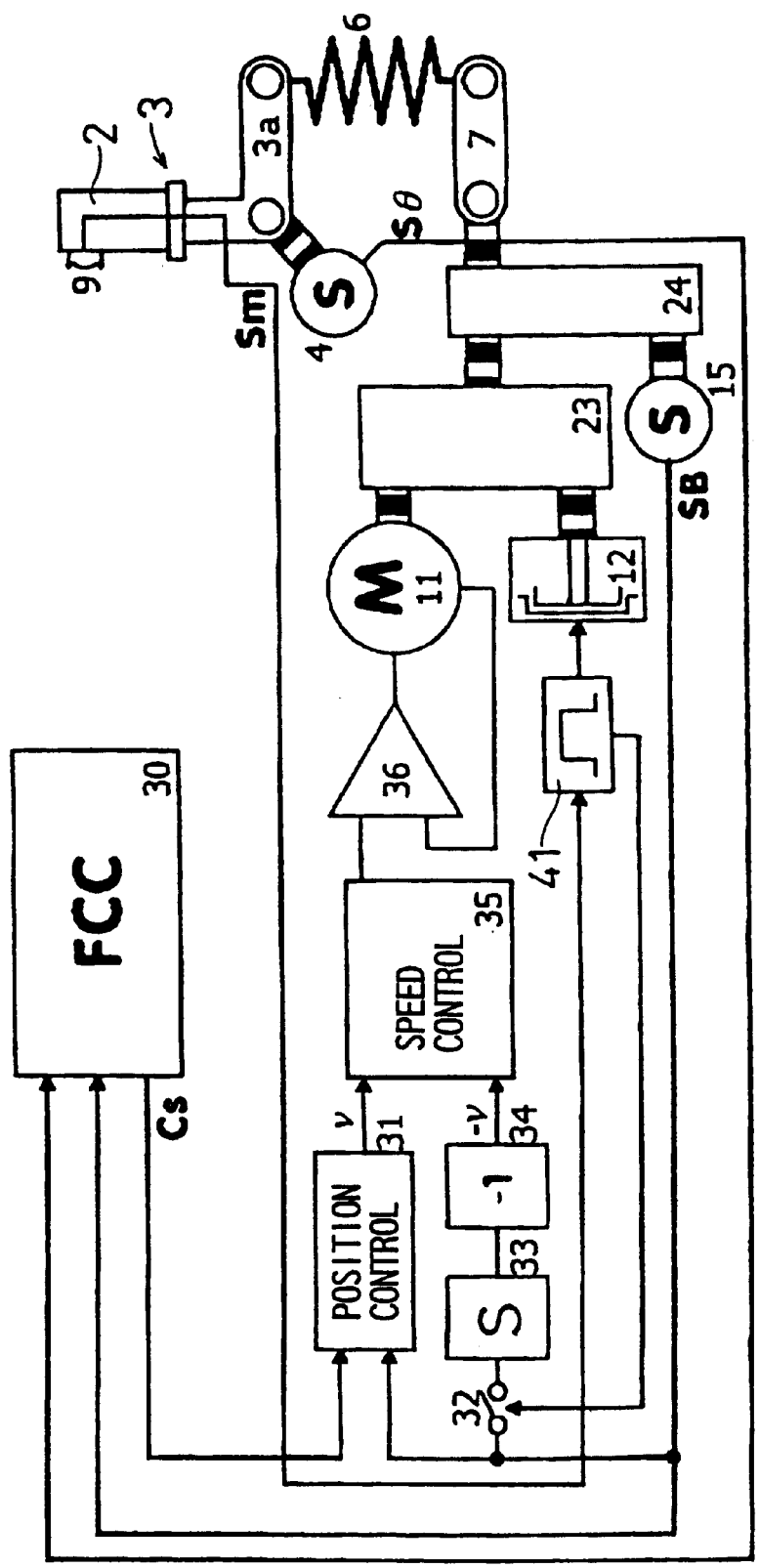
FIG. 2 is a block diagram showing the electrical configuration of a first embodiment of the invention.

FIG. 2 is a block diagram showing the electrical configuration of a first embodiment of the invention. The flight control computer (FCC) 30 has a function of electrically controlling the control system on the basis of signals from various sensors, a host computer, etc. In this embodiment, the flight control computer receives the stick position signal Sθ and the back drive position signal SB, and outputs a control position command signal Cs for driving the stick 3.

When a one-shot timer circuit 41 receives the electromagnetic signal Sm from the switch 9 as a trigger, the circuit 41 supplies driving pulses to the electromagnetic brake 12 and a relay switch 32. The relay switch 32 is normally turned off, and is turned on only during a period of time when the driving pulse from the one-shot timer circuit 41 is on. The time width of the driving pulse is set to, e.g. several to several tens of milliseconds, to be longer than a period when there is a possibility of occurrence of transient.

A position control circuit 31 produces a speed signal V on the basis of the control position command signal Cs and the back drive position signal SB, and supplies the speed signal V to a speed control circuit 35. The back drive position signal SB is sent via the relay switch 32 to a differentiating circuit 33 to be differentiated, and then inverted by a polarity inversion circuit 34. The inverted signal is supplied to the speed control circuit 35 as a speed signal −V.

Based on the speed signals V and −V, the speed control circuit 35 supplies a servo signal to a motor drive circuit 36. The motor drive circuit 36 performs current feedback so as to drive the back drive motor 11 on the basis of the servo signal.

Next, the operation will be described. When the stick 3 is to be used in a normal mode, the electromagnetic brake 12 is in a state of connection. The relay switch 32 is turned off. When the stick 3 is operated under this condition, the stick position sensor 4 detects the angular displacement amount of the stick 3 and supplies the stick position signal Sθ to the flight control computer 30. Based on the stick position signal Sθ, the flight control computer 30 controls various steering mechanisms. At this time, the control position command signal Cs is zero.

Even when the pilot moves the stick 3 by hands, the output arm 7 is not moved because the brake acts, and hence the spring 6 extends or contracts. When the switch 9 is pressed, the restoring force of the spring 6 causes the swing arm 3a, the spring 6, the output arm 7, the output gear train 24, the differential gear section 23, the gear trains 21 and 22, the rotor of the back drive motor 11 and the like to start to rotate. Because of the inertial effect of these members, a transient occurs.

Then, the electromagnetic brake 12 is put into a state of disconnection, and at the same time the relay switch 32 is turned on. As a result, the speed signal −V which is obtained by differentiating the back drive position signal SB is supplied to the speed control circuit 35, so that the back drive motor 11 is rotated in the reverse direction.

In one method, the speed of the output arm 7 is controlled by rotating the back drive motor 11 in the reverse direction so that the speed signal −V does not exceed an allowable speed. In this case, a differential speed command corresponding to the difference between a predetermined allowable speed Vo and the back drive position signal SB is given to the back drive motor 11. In the case where the control position command signal Cs coincides with the back drive position signal SB, the back drive motor 11 is controlled to operate so that the speed signal −V becomes zero, thereby to minimize the change of the back drive position signal SB from the position at this time. The change of the control position command signal Cs is zero, and also the speed signal V supplied from the position control circuit 31 is zero. In this way, the operation of the high-speed transmission system which causes a transient is damped, and the displacement of the transient can be canceled in an instant by the rotation of the back drive motor 11. Therefore, it is possible to prevent an influence of the transient from being transmitted to the stick 3.

Figure 3:
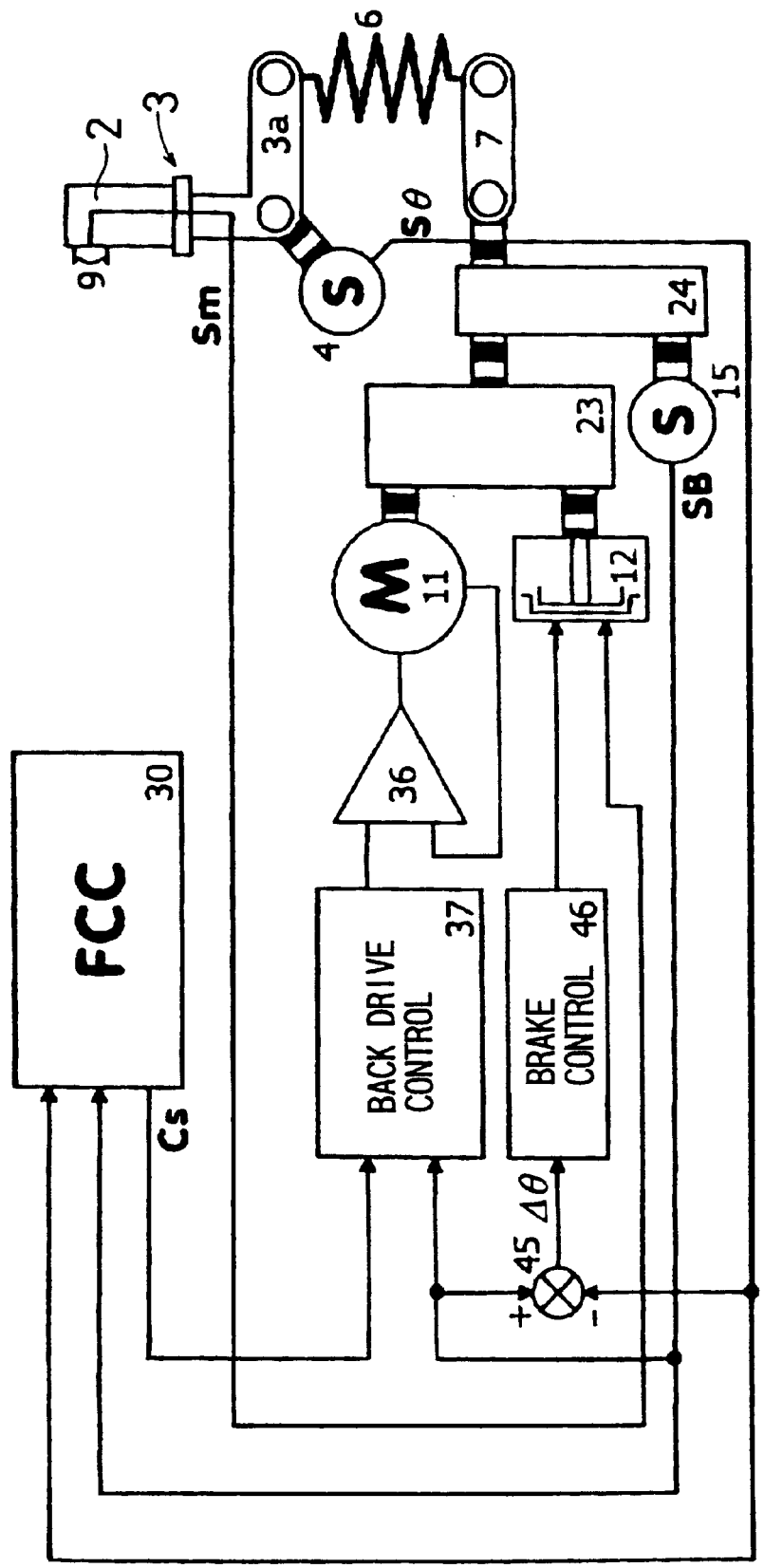
FIG. 3 is a block diagram showing the electrical configuration of a second embodiment of the invention.

FIG. 3 is a block diagram showing the electrical configuration of a second embodiment of the invention. The flight control computer (FCC) 30 operates in a similar manner to that shown in FIG. 2, and hence its duplicated description is omitted.

A back drive control circuit 37 supplies the servo signal to the motor drive circuit 36 on the basis of the control position command signal Cs and the back drive position signal SB. The motor drive circuit 36 performs a current feedback so as to drive the back drive motor 11 on the basis of the servo signal.

A difference circuit 45 subtracts the stick position signal Sθ from the back drive position signal SB, and outputs a difference signal Δθ corresponding to the difference between the signals. A brake control circuit 46 detects that the difference signal Δθ has become zero, and then activate the electromagnetic brake 12.

Next, the operation will be described. In the case where the stick 3 is to be used in a normal mode, the electromagnetic brake 12 is in a state of connection and the relay switch 32 is turned off. When the stick 3 is operated under this condition, the stick position sensor 4 detects the angular displacement amount of the stick 3 and supplies the stick position signal Sθ to the flight control computer 30. Based on the stick position signal Sθ, the flight control computer 30 controls various steering mechanisms.

During the pilot operates the stick 3, elastic energy corresponding to the expansion and contraction amounts of the spring 6 are accumulated. When the electromagnetic brake 12 is operated under this condition, the brake is released. Therefore, the elastic energy of the spring 6 causes the output arm 7, the output gear train 24, the differential gear section 23, and the gear trains 21 and 22 of the back drive unit 10, the rotor of the back drive motor 11, and the like to start to rotate, with the result that these movable members have an inertial force. Since the movable members do not stop rotating even after the stick position signal Sθ coincides with the back drive position signal SB, such movement appears as an overshoot to produce an influence of the transient on the stick 3.

Consequently, the following countermeasure is taken. After the switch 9 is pressed to release the brake and the output arm 7 then starts to move, the difference circuit 45 compares the stick position signal Sθ with the back drive position signal SB. When the difference signal Δθ indicative of the relative displacement amount of the two position signals becomes zero, the electromagnetic brake 12 is temporarily operated. As a result, the input shaft 23b of the differential gear section 23 is braked and rapidly stops. In this way, at a point in time when it is detected that the expansion and contraction amounts of the spring 6 has become zero, the electromagnetic brake 12 is operated. Therefore, it is possible to prevent a transient due to the elastic energy accumulated in the spring 6 from exerting an influence.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A control apparatus comprising:
   a control section which is supported so as to be angularly displaceable to a housing;
   a control amount sensor for detecting an angular displacement amount of the control section and outputting a control amount signal;
   an elastic member for generating an operation force in accordance with the angular displacement amount based on a neutral point of the control section;
   a back drive mechanism, coupled to the control section via the elastic member, for driving the control section to move the neutral point; and
   a controlling section for controlling the back drive mechanism,
   the back drive mechanism including a differential gear mechanism having a first input shaft, a second input shaft and an output shaft; a motor coupled to the first input shaft; a brake mechanism coupled to the second input shaft; and a driving member coupled to the output shaft, for driving the control section, and
   wherein when the control section is being moved, the brake mechanism is put into disconnection to release the second input shaft, the back drive mechanism rotates the motor in a reverse direction in order to prevent occurrence of a transient.

2. A control apparatus comprising:

a control section which is supported so as to be angularly displaceable to a housing;

a control amount sensor for detecting an angular displacement amount of the control section and outputting a control amount signal;

an elastic member for generating an operation force in accordance with the angular displacement amount based on a neutral point of the control section;

a back drive mechanism, coupled to the control section via the elastic member, for driving the control section to move the neutral point; and a controlling section for controlling the back drive mechanism, the back drive mechanism including a differential gear mechanism having a first input shaft, a second input shaft and an output shaft; a motor coupled to the first input shaft; a brake mechanism coupled to the second input shaft; a driving member coupled to the output shaft to drive the control section; and a back drive position sensor for detecting an angular displacement amount of the driving member and outputting a back drive position signal, and wherein when the control section is being moved, the brake mechanism is put into disconnection to release the second input shaft, the back drive mechanism temporarily stops the second input shaft by putting the brake mechanism into connection at a time when a relative displacement amount between the control amount signal and the back drive position signal becomes zero, in order to prevent occurrence of a transient.

* * * * *